United States Patent
Slak et al.

(10) Patent No.: US 11,356,848 B2
(45) Date of Patent: *Jun. 7, 2022

(54) INFERENCE-BASED DETECTION OF PROXIMITY CHANGES

(71) Applicants: Alain Slak, Bedford, MA (US); Paul Bradford, Bedford, MA (US); Boris Boruchovich, Bedford, MA (US); Lou Bergandi, Fallbrook, CA (US); Jay Tucker, Arlington, MA (US); Joel Lemieux, Natick, MA (US); Jason Mafera, Francestown, MA (US)

(72) Inventors: Alain Slak, Bedford, MA (US); Paul Bradford, Bedford, MA (US); Boris Boruchovich, Bedford, MA (US); Lou Bergandi, Fallbrook, CA (US); Jay Tucker, Arlington, MA (US); Joel Lemieux, Natick, MA (US); Jason Mafera, Francestown, MA (US)

(73) Assignee: Imprivata, Inc., Lexington, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/089,982

(22) Filed: Nov. 5, 2020

(65) Prior Publication Data
US 2021/0127264 A1    Apr. 29, 2021

Related U.S. Application Data

(63) Continuation of application No. 16/395,779, filed on Apr. 26, 2019, now Pat. No. 10,917,788, which is a (Continued)

(51) Int. Cl.
*G06F 15/16* (2006.01)
*H04W 12/06* (2021.01)
(Continued)

(52) U.S. Cl.
CPC .............. *H04W 12/06* (2013.01); *G06N 3/02* (2013.01); *H04W 4/80* (2018.02); *H04W 12/082* (2021.01);
(Continued)

(58) Field of Classification Search
None
See application file for complete search history.

(56) References Cited

U.S. PATENT DOCUMENTS 8,607,067 B1    12/2013   Janse Van Rensburg et al.
8,943,580 B2    1/2015    Fadell et al.
(Continued)

OTHER PUBLICATIONS

H. Rahimi, A. Nur Zincir-Heywood and B. Gadher, "Indoor geofencing and access control for wireless networks," 2013 IEEE Symposium on Computational Intelligence in Cyber Security (CICS), 2013, pp. 1-8, doi: 10.1109/CICYBS.2013.6597198.*

*Primary Examiner* — Brian Whipple
*Assistant Examiner* — Gregory P Tolchinsky
(74) *Attorney, Agent, or Firm* — Morgan, Lewis & Bockius LLP

(57) ABSTRACT

Embodiments of the present invention analyze multiple factors—such as user input events, device motion data, other data from the endpoint, or data from an external system (such as a real-time location system)—to make a probabilistic determination whether a walkaway event has occurred.

27 Claims, 3 Drawing Sheets

Related U.S. Application Data continuation-in-part of application No. 15/843,460, filed on Dec. 15, 2017, which is a continuation-in-part of application No. 14/945,658, filed on Nov. 19, 2015, now Pat. No. 10,216,366.

(60) Provisional application No. 62/183,793, filed on Jun. 24, 2015, provisional application No. 62/081,820, filed on Nov. 19, 2014.

(51) Int. Cl.
    *H04W 24/08*    (2009.01)
    *H04W 4/80*     (2018.01)
    *G06N 3/02*     (2006.01)
    *H04W 76/10*    (2018.01)
    *H04W 12/63*    (2021.01)
    *H04W 12/082*   (2021.01)

(52) U.S. Cl.
    CPC ........... *H04W 12/63* (2021.01); *H04W 24/08* (2013.01); *H04W 76/10* (2018.02)

(56) References Cited

U.S. PATENT DOCUMENTS

| | | |
|---|---|---|
| 9,405,602 B1 | 8/2016 | Verne et al. |
| 10,216,366 B2 | 2/2019 | Ullrich |
| 10,656,796 B2 | 5/2020 | Ullrich |
| 2005/0076078 A1 | 4/2005 | Salton |
| 2006/0230140 A1* | 10/2006 | Aoyama .................. G06N 3/08 709/224 |
| 2008/0010229 A1 | 1/2008 | Lee Shu Tak |
| 2008/0184355 A1 | 7/2008 | Walrath |
| 2008/0260119 A1 | 10/2008 | Marathe et al. |
| 2009/0063852 A1 | 3/2009 | Messerges et al. |
| 2009/0301200 A1 | 12/2009 | Wakefield |
| 2009/0303329 A1 | 12/2009 | Morisaki |
| 2010/0093380 A1 | 4/2010 | Gustafsson |
| 2011/0159884 A1* | 6/2011 | Chawla ............. H04W 52/0251 455/456.1 |
| 2012/0072521 A1 | 3/2012 | Goodman et al. |
| 2012/0144452 A1 | 6/2012 | Dyor et al. |
| 2012/0233314 A1 | 9/2012 | Jakobsson |
| 2012/0323592 A1* | 12/2012 | Bechtel .................... G06F 19/00 705/2 |
| 2013/0110537 A1 | 5/2013 | Smith |
| 2013/0152047 A1 | 6/2013 | Moorthi et al. |
| 2013/0157685 A1* | 6/2013 | Young .................. H04W 64/00 455/456.1 |
| 2014/0123249 A1 | 5/2014 | Davis et al. |
| 2014/0156833 A1 | 6/2014 | Robinson |
| 2014/0200036 A1 | 7/2014 | Egner et al. |
| 2014/0282877 A1 | 9/2014 | Mahaffey et al. |
| 2015/0070134 A1* | 3/2015 | Nagisetty ............. H04W 12/08 340/5.61 |
| 2015/0088978 A1 | 3/2015 | Motukuru et al. |
| 2015/0172920 A1* | 6/2015 | Ben Ayed .......... H04L 63/0492 713/172 |
| 2015/0188956 A1* | 7/2015 | Chauhan ................ H04L 29/06 726/7 |
| 2015/0334439 A1 | 11/2015 | Zhang |
| 2016/0043968 A1 | 2/2016 | Jacob et al. |
| 2016/0078750 A1* | 3/2016 | King ..................... A61B 5/002 340/506 |
| 2016/0092875 A1* | 3/2016 | Howe ................ G06Q 20/4016 705/44 |
| 2016/0112871 A1 | 4/2016 | White |
| 2017/0109770 A1 | 4/2017 | Kusens et al. |
| 2018/0109936 A1 | 4/2018 | Ting et al. |
| 2019/0313252 A1 | 10/2019 | Slak et al. |

\* cited by examiner

INFERENCE-BASED DETECTION OF PROXIMITY CHANGES

RELATED APPLICATION

This application is a continuation of U.S. Ser. No. 16/395,779, filed Apr. 26, 2019, which is a continuation-in-part of U.S. Ser. No. 15/843,460, filed on Dec. 15, 2017, which is itself a continuation-in-part of Ser. No. 14/945,658, filed on Nov. 19, 2015, which claims priority to U.S. Provisional Application Nos. 62/081,820, filed Nov. 19, 2014, and 62/183,793, filed Jun. 24, 2015. The entire disclosures of the foregoing priority documents are hereby incorporated herein by reference.

TECHNICAL FIELD

The invention relates generally to healthcare information technology, and in particular to systems and methods for location-based management of data, access control, and clinical collaboration.

BACKGROUND

In a busy healthcare environment, such as a hospital, clinicians roam frequently among patients, floors and buildings. Each time a clinician reaches a new location, she may require access to patient information or other medical data maintained by the facility (or elsewhere). That data may be accessed via a local, typically shared workstation; a handheld wireless device, such as a "smart phone" or tablet capable of hosting applications and establishing telecommunications, Internet and/or local intranet connections; or a piece of medical equipment. Such devices are often called "endpoints."

In particular, medical institutions from hospitals to physician practice groups to testing centers maintain diverse electronic medical records (EMR) systems, which collectively form the healthcare information backbone. EMR systems allow clinicians access to medical information maintained in various back-end systems. The typical workflow when a physician interacts with a patient involves first logging onto the computer system, then launching and logging into one or more EMR applications, selecting the right patient record, verifying that the record matches the patient, reviewing results (often from different sources), checking up on medical references, entering orders or prescriptions (e.g., using computerized physician order entry (CPOE) applications and ePrescribing), and/or charting patient progress. All of these activities may involve the same patient but different applications, and in some cases multiple separate applications for a single patient-specific activity.

Moreover, healthcare records are protected by strict privacy laws (such as the Health Insurance Portability and Accountability Act, or HIPAA), regulatory regimes, and institutional access policies. Accordingly, when a clinician moves from place to place, he may be required to log on to a new terminal or device, and because of data-access restrictions, the log-on procedure may involve cumbersome and/or multiple authentication modalities.

Granting initial access is only half the story, however. Once a user has presented the necessary credentials to gain entry to a secure computer system, he may depart from the authenticated session without terminating the session, leaving sensitive data exposed to access by unauthorized individuals. It is therefore important to ensure that endpoints are secured while they are not in use to protect sensitive data.

Many currently available commercial solutions for detecting user presence and departure suffer from significant practical limitations. For example, when "timeouts" are used to terminate system access if keyboard or mouse activity is not detected during a pre-set period of time, the operator's physical presence is insufficient to retain access, and erroneous termination may result in cases of extended passive interaction (e.g., when the user reads materials on the screen). For this reason, inactivity timers are generally set to be long periods of time to avoid inconveniencing users, particularly in clinical environments. But that compromises their effectiveness.

Further, such systems cannot discriminate between different users, and a timeout period introduces the potential for unauthorized use during such period. Approaches that use radio-frequency (RF) or similar token objects to detect user departure based on an increase in distance between the token object and a base transceiver suffer from an inability to reliably resolve the distance between the token and receiver, which can result in a restricted or unstable detection zone. Furthermore, the token objects can be readily swapped or shared.

Similarly, Bluetooth Low Energy (BLE) has recently been used to secure endpoints. The endpoint senses a BLE device (such as a smart phone) associated with the user and monitors the device signal strength using the Received Signal Strength Index (RSSI) metric. When the RSSI indicates a weak signal, implying that the user has moved away from the endpoint, the endpoint is secured by, for example, terminating the session. A shortcoming of this approach is the limited signal information available using RSSI from a single pair of BLE transceivers to reliably discriminate between a genuine "walkaway event" (i.e., the user's departure) and continued user presence. For example, the user might have her phone in the line of sight of the endpoint's BLE radio when she approaches and begins using the endpoint, but the phone can be moved where the line of sight is obstructed, which may significantly reduce the RSSI of the phone as detected by the endpoint. This is difficult to distinguish from someone who has actually moved away from the endpoint.

Yet another solution involves detecting and tracking an operator visually. For example, operator detection and/or identification may be achieved using one or more video cameras mounted to the computer terminal in conjunction with object-recognition techniques (e.g., based on analysis of one or a sequence of images) to detect and locate a single operator, which generally involves differentiating the operator from non-operators and the background scene. Once an operator is identified, her movements within a predefined detection zone, such as a pyramidal volume extending radially outward from the secure computer terminal, are tracked to determine when and whether she interacts with the secure system. In certain implementations, this is done without having to continually re-identify the operator, instead relying on following the motion of the operator with the help of computer-vision motion analysis and other techniques. The position and size of the operator may be tracked to detect a walkaway event. The reappearance of the operator after an absence from the detection zone may also be detected. For example, a stored exemplar of previously identified operators may be used to detect and authenticate the operator upon reappearance and within a pre-defined time window.

One problem associated with visual presence-detection systems is their reliance on relative face sizes to identify the operator among multiple people detected in the field of view of the camera. While, on average, the operator's face (due to his proximity to the camera) appears largest in the image, variations in people's head sizes as well as different hair styles and head covers that occlude the face to varying degrees can result in the misidentification of the operator. An even greater problem of conventional systems is the high rate of false alarms signaling walk-away events. This issue arises from the use of color, intensity, and/or gradient information (or similar two-dimensional cues) in the images to compare tracked foreground patches in previous image frames to query patches in the current frame. If background objects have cues similar to those of the tracked foreground object, which is generally true for faces, false matches are frequently generated—e.g., the face of a person in the background may be incorrectly matched to the face of the operator in a previous image. Thus, when the person in the background subsequently leaves the scene, a walk-away event is falsely declared, and, conversely, when the person in the background remains in the scene, the operator's departure goes unnoticed by the system.

Accordingly, there is a need for improved ways of sensing walkaway events that minimize the number of false positives (where the user in fact remains at the secure resource) without sacrificing accuracy, i.e., excessive false negatives (undetected walkaway events).

SUMMARY

Embodiments of the present invention analyze multiple factors—such as user input events, device motion data, other data from the endpoint, or data from an external system (such as a real-time location system)—to make a probabilistic determination whether a walkaway event has occurred.

Accordingly, in a first aspect, the invention relates to a method of detecting departure of a previously authenticated user from proximity to a secure resource. In various embodiments, the method comprises the steps of establishing a wireless communication link between the secure resource and a device proximate thereto; verifying, by the secure resource, an association between the authenticated user and the device; monitoring over time, by the secure resource, a signal strength of the wireless communication link and periodically storing, in a computer memory, values indicative of the monitored signal strength; periodically analyzing, by the secure resource, the stored values for patterns indicative of a walkaway event and, when a pattern indicative of a walkaway event is detected, assigning a probability thereto; and if the probability exceeds a threshold specified by a security policy, registering a walkaway event and terminating the authenticated user's access to the secure resource.

In some embodiments, the secure resource verifies the association by communication with a location server having access to a user database. The authenticated user's access to the secure resource may be terminated by, for example, ending a session hosted by the secure resource or launching a privacy screen removable only by a new authentication. The wireless communication link may be a short-range wireless protocol such as Bluetooth Low Energy.

In various embodiments, the threshold is a first threshold and, if the probability does not exceed the first threshold but does exceed a second threshold lower than the first threshold, the method further comprises the step of obtaining, by the secure resource, corroborating data indicative of the probability of a walkaway event. Such corroborating data may be a GPS location obtained from the device and/or pedestrian dead reckoning.

In some embodiments, the analyzing step is performed with a neural network, e.g., a recurrent neural network. The method may, in some embodiments, further include the step of subscribing, by the secure resource following the user's authentication, to location events of the user with a location server configured to broadcast location events to subscribers thereto.

In another aspect, the invention pertains to a system comprising a plurality of secure resources. In various embodiments, each of the secure resources itself comprises a processor, a computer memory including stored instructions executable by the processor for implementing (i) an authentication module and (ii) an event-monitoring module, a wireless interface for establishing wireless communication links with user devices proximate to the secure resource, and RSSI circuitry configured to (i) monitor a signal strength of a wireless communication link between the wireless interface and a user device, and (ii) periodically store, in the computer memory, values indicative of the monitored signal strength. The authentication module may be configured to authenticate a user and verify an association between the authenticated user and the linked user device, and the event-monitoring module may be configured to (i) periodically analyze the stored values for patterns indicative of a walkaway event and, when a pattern indicative of a walkaway event is detected, assign a probability thereto; and (ii) if the probability exceeds a threshold specified by a security policy, terminating the authenticated user's access to the secure resource.

In various embodiments, the system further comprises a user database storing associations between users and the user devices. The event-monitoring module may be configured to terminate the authenticated user's access to the secure resource by ending a session hosted by the secure resource or by launching a privacy screen removable only by a new authentication by the authentication module. The wireless communication link may be a short-range wireless protocol such as Bluetooth Low Energy.

In some embodiments, the threshold is a first threshold and the event-monitoring module is configured to obtain, if the probability does not exceed the first threshold but does exceed a second threshold lower than the first threshold, corroborating data indicative of the probability of a walkaway event. For example, the corroborating data may be a GPS location obtained from the user device via the wireless interface.

In various embodiments, the system further comprises a plurality of tracking sensors at different locations in an institutional space, each of the tracking sensors being configured to detect a proximate presence of an individual or a device and to produce signals indicative thereof, and a location server in operative communication with the tracking sensors and the secure resources via a network. The location server may further include computer storage defining (i) a user location database that stores records for a plurality of users, each of the records including a current location of the user based on signals from the tracking sensors; (ii) a device location database that stores records for a plurality of devices, each of the records including a current location of the device; and (iii) a subscription database that stores records for a plurality of applications each running on a different device, where each of the records specifies an application and one or more location events to which the application has subscribed. The secure resources may be configured to subscribe to location events of the user with the location server, and the location server may be configured to receive signals from the tracking sensors, interpret the received signals as events, and notify secure resources upon occurrence of events to which they subscribe.

In some embodiments, the event-monitoring module implements a neural network, e.g., a recurrent neural network.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, routines, steps, or characteristics may be combined in any suitable manner in one or more examples of the technology. As used herein, the terms "approximately" and "substantially" mean±10%, and in some embodiments, ±5%.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
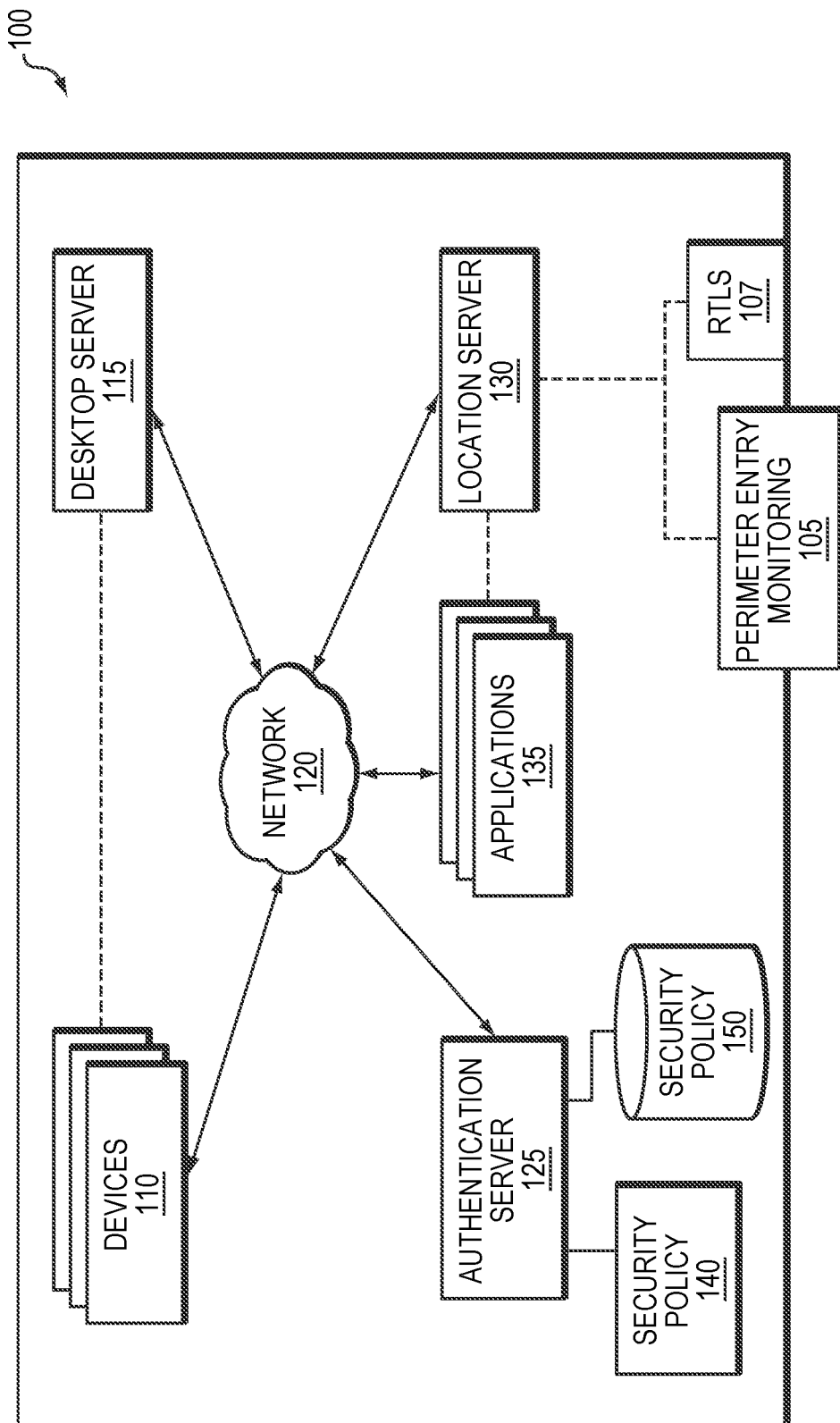
FIG. 1 schematically illustrates an institutional space including devices and servers in accordance with embodiments of the invention.

In representative working environments, locational events are registered and communicated to a system node (e.g., a location server) that collects and responds to event notifications as they are received. In particular, distributed applications can "subscribe" to events relevant to their operation, and when an event notification is received by the location server, it is communicated to all applications subscribing thereto—i.e., to the particular event or to an event category to which it belongs. The user's instantaneous location may be established based on the location of a currently stationary but movable device or by direct tracking, e.g., using "real-time location services" (RTLS).

Most simply, a walkaway event may result from a user exiting a monitored geospatial zone or entering another one, or leaving the vicinity of a secure resource such as a workstation. To detect the latter type of event, an RSSI signal may be analyzed in a manner robust to common activities that might falsely suggest departure of the user from the secure resource. Suppose a user carries a mobile device that operates as a BLE transceiver by virtue of a conventional Bluetooth application ("app") running on the device. The secure resource also runs a BLE application and consequently behaves as a BLE transceiver. The secure resource also includes an RSSI circuit, which measures the signal strength of a BLE connection. When the user's device comes within sensing range of the secure resource, the BLE application detects and recognizes it, and measures the signal strength using the RSSI circuit. The user authenticates herself to the secure resource in accordance with the security policy applicable both to the user and the secure resource, and the RSSI circuit continues to measure and record the signal strength. An event-monitoring agent continuously or periodically monitors the RSSI, and recognizes temporal patterns indicative of possible walkaway events. When such a pattern is detected, a walkaway event is registered or further types of data are considered before concluding that such an event has taken place. For example, the event-monitoring agent may interrogate the user's device or an RTLS system for additional information bearing on the probability of a walkaway event. The event-monitoring agent may, upon recognition of a device, subscribe to RTLS events relevant to the device or its associated user.

Authentication may be handled by a conventional authentication server, which may subscribe to events involving geospatial zones that require credentials for entry. When a clinician attempts to access a secure resource—e.g., by logging in at a workstation—the resource may consult an authentication server to determine the credentials necessary for access, since these may differ for different user groups. In addition, the required credentials may have a locational component; for example, a clinician may already have authenticated using one factor (e.g., gaining entry to a secure area using an access card), in which case only one additional factor (e.g., a password) is necessary for access to the resource. Therefore, the authentication server may subscribe to all events relevant to the security policy it implements.

The system may also support presumptive workflows, optimistic caching, and anticipatory provisioning. For example, a desktop or application server may implement optimistic caching of application data based on expected clinician movement within the institutional space, making the data available on a workstation or other device before the clinician actually reaches it. Alternatively or in addition, desktop server may implement anticipatory provisioning by storing a user's current "session" for subsequent re-creation when a clinician leaves a node or logs off the current session. In practice, this means that data sufficiently descriptive of the current user state is maintained to ease subsequent provisioning of the session on a different device. The degree of provisioning can range from re-launch of applications in use during the previous session to full re-creation of the session state prior to departure from the device or log-off, including retrieval of the data (e.g., the particular patient records or lab results being viewed in an EMR application).

As used herein, the term "session" refers broadly to the state of an application active on a user's device. Although a session may be viewed as involving both remotely hosted and purely local applications, the present invention is primarily concerned with the former—i.e., applications that may be remotely "provisioned" to the user via a virtual desktop. At the same time, it should be understood that some local applications can be replicated by remote hosting; that is, so long as an application is amenable to subsequent remote provisioning, it is immaterial for purposes of defining a "session" whether the application is currently being run locally (offline) or on a hosted basis.

Refer to FIG. 1, which illustrates a generalized environment in which embodiments of the invention may be deployed. The environment is an institutional space 100, such as a hospital, which may include multiple buildings each including perimeter-entry monitors 105. These may, for example, be card readers that detect and log user entry into the institution and/or restrict entry to secure areas to authorized personnel. An RTLS system 107 monitors the changing locations of users with the space 100 (e.g., via wireless detection of tags worn by users and/or affixed to devices they carry, by face recognition, or any other suitable means). A typically large number of devices 110, which may be movable within the space 100, are available for mobile users (i.e., clinicians who roam from place to place within the space 100) as they discharge their responsibilities. These devices 110, which include workstations, thick or thin client devices, kiosks, and network-connected medical devices are herein referred to collectively as "nodes." In general, a node is able to access, via a network, one or more data stores that include information (e.g., EMR) of interest to clinicians.

A desktop server 115 generates "virtual desktops" for users that are displayed on one of the devices 110 when the user logs in at that device. Particularly in secure environments or where sensitive data is accessed, many applications are not launched locally at the device 110 but are provided through a portal or "desktop agent," such as XENDESKTOP (supplied by Citrix Corp.) or the like, running on the device 110. The portal is in communication with desktop server 115 via a network 120. In a virtual-desktop environment, applications run within a hosted session generated on a secure, "locked-down" desktop server 115, which can create and maintain many simultaneous sessions at different devices 110. See, e.g., U.S. Pat. Nos. 8,866,701 and 9,009,219, the entire disclosures of which are hereby incorporated by reference.

Log-on may be handled by a separate authentication server 125, which authenticates users based on their credentials in accordance with an institutional security policy 140 stored on or available to authentication server 125. That policy may require different tiers of authentication depending on the data to which the user seeks access; for example, a simple password log-in may be sufficient for access to routine applications, while a "strong" modality such as a biometric (e.g., fingerprint or vein) scan may be required for access to secure data. A location server 130 maintains awareness of the locations of users within the space based on indicators such as the device on which the user's current session is active or, if the device location is unknown or no session is active, based on perimeter accesses and RTLS 207. RTLS reference points, which can be either transmitters or receivers, are spaced throughout a facility to detect the presence of identified tags.

A plurality of applications, representatively illustrated at 135 and hosted on nodes, "subscribes" to events monitored by location server 130. As described in greater detail below, this means that applications register with location server 130 to receive notification of particular events. These events may be represented an any level of granularity selected by the system designer, and the available choices may depend on the capabilities of location server 130. For example, an application 135 that retrieves and displays EMR data may, upon launch, subscribe to receive notifications of all walk-away events relating to the device on which it is running. (Walk-away and walk-up events may be detected using a camera or the time-varying signal strength from a mobile device; see, e.g., U.S. Ser. Nos. 13/920,613 and 14/945,609, and U.S. Pat. No. 8,538,072, the entire disclosures of which are hereby incorporated by reference.) In this case, location server 130 is responsible for gathering and filtering all walk-away events and notifying only those applications to which a particular event is relevant; it must also detect (or be informed by the application 135 of) the device on which the subscribing application 135 is running. In this connection, it should be stressed that applications 130 may be hosted locally, on a workstation or user device, or remotely on an application server. So long as the application can communicate with location server 130 via network 120, the manner in which the application is hosted does not matter. If the network protocol (e.g., ETHERNET) over which the application 135 and location server 130 communicate requires packets to identify the source device, location server 130 can readily infer the relevant device from the initial subscription request.

The security policy 140 may have a locational component, and as a result, authentication server 125 may subscribe to events relevant to the policy 140 and, in some embodiments, stores in a database 150 data relating to currently active applications and resources to which it has granted access. The stored data can specify a user, device, location, proximity, and/or previous authentication events. For example, authentication requirements for a user to access a resource may differ depending on the user's current location, since presence in a secure area means that the user has already presented some form of credential (such as an access card), which may serve as one factor of a two-factor authentication requirement. Although authentication server 125 might not subscribe to every location-related event that could prove relevant to an authentication decision, it can request relevant information from location server 130 when the user attempts to authenticate—e.g., inquiring whether the user is currently within an access-controlled space if this is not evident from the request-originating user device. On the other hand, authentication server 125 may subscribe to all walk-away events, or all walk-away events pertaining to secure resources for which authentication is required. Once a walk-away event is detected and notification thereof received by authentication server 125, the server may terminate the user's session with the secure resource or cause temporary launch a privacy screen-saver on the device from which the user walked away. If a walk-up event involving the same user and device is detected within a short time after the detected walk-away event, the privacy screen may be automatically removed and the user once again accorded access to the secure resource. In one representative workflow, once the user has first authenticated and obtained access to the secure resource, authentication server 125 subscribes to all location events involving the user and the device. It therefore receives notification of the walk-away event, since this involves both the user and the device, and causes the accessing device to launch a privacy screen-saver. When the user returns, location server 130 may report both a generic walk-up event (which itself would be insufficient) as well as proximity detection of a mobile device associated with the user. If this information, in combination with a short time between walk-away and walk-up events, is sufficient to satisfy security policy 140, authentication server 125 may cause the privacy screen to be removed. As a result, the user automatically receives immediately renewed access to the secure resource without any action or new authentication.

As used herein, the term "application" means any running process on a computational device, and in a medical setting can include healthcare information (e.g., EMR) and workflow (e.g., CPOE) systems as well as conventional software such as word processors, spreadsheets, and browsers. Applications may be configured to operate freely as long as non-sensitive information is accessed. When the user operates an application to request secure data or access to a secure resource, the application communicates with authentication server 125 and permits access only upon successful authentication in accordance with the applicable security policy. Of course, events need not relate to security; at a more general level, applications subscribe to events that are relevant to tasks or workflows they support (either autonomously or in concert with other applications). Moreover, monitored individuals are not limited to application users—for example, patients as well as their caregivers and hospital staff may be tracked by location server 130. A CPOE system, for example, may subscribe to events involving all currently resident patients (tracked by bracelets or wireless tags encoding patient IDs) for whom prescriptions have been written. When a clinician dispenses a drug to a patient, the CPOE system may ensure that the patient is actually co-located with the clinician. For example, before actually administering medication to a patient, a clinician may scan a barcode accompanying the medication, and which encodes the patient ID; the CPOE responds to the read barcode by consulting a database of patients, their IDs, and their current locations, which are updated each time location server 130 registers a change in patient location; that is, the CPOE system subscribes to location events involving all patients in the database (which itself changes dynamically as prescriptions for new patients are written and patients are discharged). The CPOE also determines the location of the administering clinician (who has previously logged into the CPOE), who, for example, may be wearing a tag or carrying a mobile device tracked by RTLS 107. If the administering clinician is not co-located with (e.g., at least in the same room as) the proper patient, the clinician may be alerted by, for example, a visual and/or audible signal emitted by the barcode reader to avoid improper drug administration.

As shown in FIG. 1, the network 120 supports communication among devices 110, applications 135, and servers 115, 125, 130. The term "network" is herein used broadly to connote wired or wireless networks of computers or telecommunications devices (such as wired or wireless telephones, tablets, etc.). For example, a computer network may be a local area network (LAN) or a wide area network (WAN). When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Networked computers may be connected over the Internet, an Intranet, Extranet, Ethernet, or any other system that provides communications. Some suitable communications protocols include TCP/IP, UDP, or OSI, for example. For wireless communications, communications protocols may include IEEE 802.11x ("Wi-Fi"), Bluetooth, Zigbee, IrDa, near-field communication (NFC), or other suitable protocol. Furthermore, components of the system may communicate through a combination of wired or wireless paths, and communication may involve both computer and telecommunications networks. For example, a user may establish communication with a server using a "smart phone" via a cellular carrier's network (e.g., authenticating herself to the server by voice recognition over a voice channel); alternatively, she may use the same smart phone to authenticate to the same server via the Internet, using TCP/IP over the carrier's switch network or via Wi-Fi and a computer network connected to the Internet.

It should also be understood that while the servers 115, 125, and 130 are shown as physically separate devices within the institutional space 100, this is for illustrative purposes only. Multiple servers may in fact reside on the same computer, and may be "virtualized." Moreover, even separate machines need not reside in the institution's on-site data center; many facilities, for example, contract with a third party for authentication services delivered "in the cloud," i.e., remotely over the Internet or the public telecommunications in a manner that is indistinguishable, to users, from a wholly local implementation. Accordingly, references herein to "servers" have no topological or device-level connotation; any functionally satisfactory deployment scheme, whether on a single or multiple machines wherever located, are within the scope of the present invention.

Figure 2:
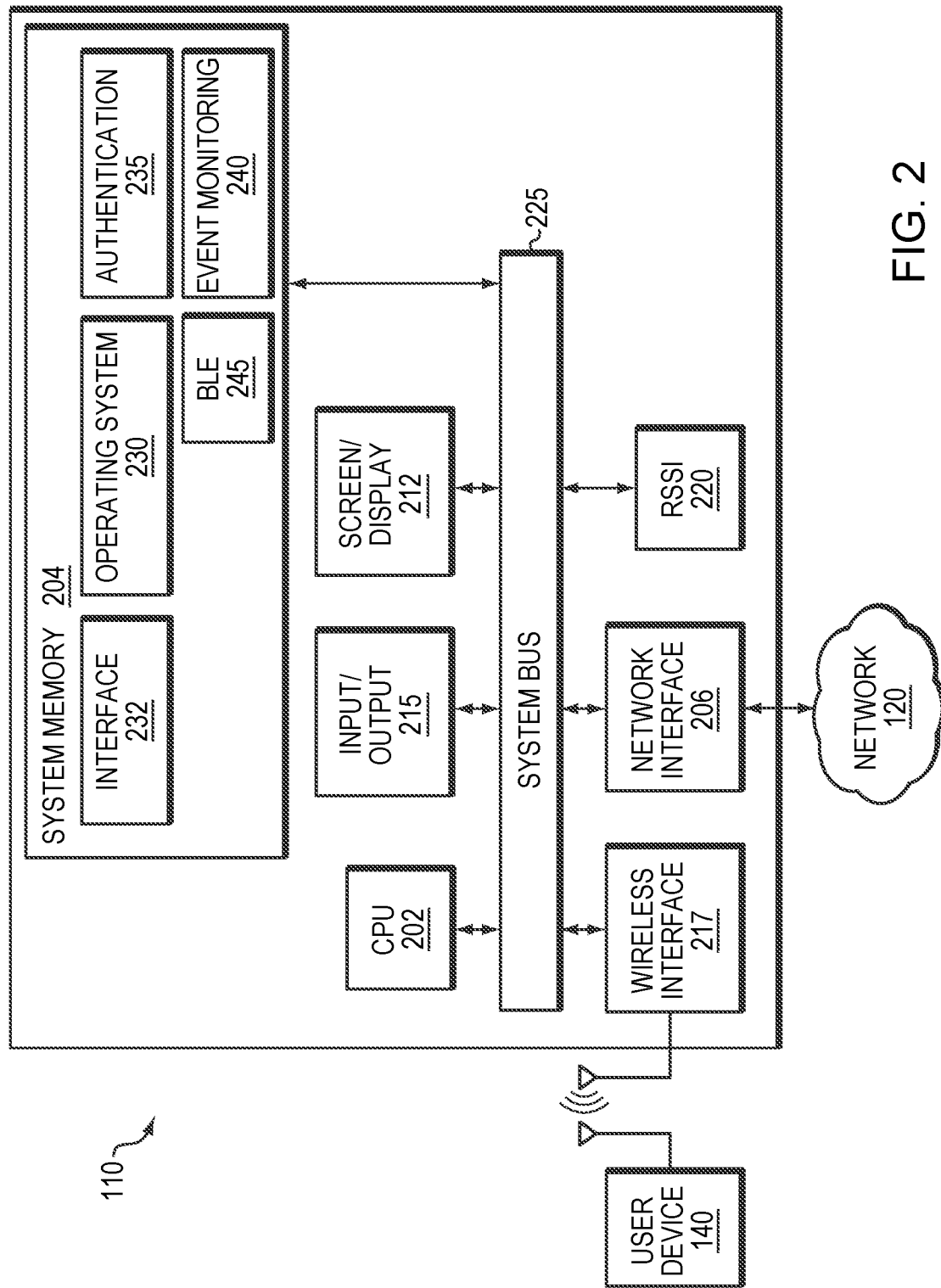
FIG. 2 schematically illustrates a node in accordance with embodiments of the invention.

FIG. 2 illustrates a representative node 110, which may be a workstation (e.g., a general-purpose personal computer running suitable software), a fat or thin client device, a kiosk, a network-connected medical device, or any other device with which clinicians and other users interact, and which may be moved from time to time within an institutional setting. Node 110 typically includes a processor 202 (e.g., a CPU microprocessor) and associated system memory 204, a network interface 206 (for connection to the institutional network 120 and/or the Internet), and, usually, one or more non-volatile digital storage elements (such as a hard disk, CD, DVD, USB memory key, etc.) and associated drives. Further, workstation 110 includes user input/output devices such as a display screen 212 and conventional tactile input devices 215 such as keyboard and mouse or touch pad. A wireless interface 217, which may be separate from or implemented within network interface 206, facilitates wireless communication with user mobile devices. In some embodiments, workstation 110 includes an RSSI circuit 220, which, again, may be implemented within or separate from the wireless interface 217. The various components communicate with each other via one or more buses 225.

In use, processor 202 executes one or more computer programs (conceptually illustrated as program modules) stored in system memory 204. An operating system 230 (such as, e.g., MICROSOFT WINDOWS, UNIX, LINUX, iOS, or ANDROID) provides low-level system functions, such as file management, resource allocation, and routing of messages from and to hardware devices (such as I/O device(s) 215) and one or more higher-level user applications (such as EMR applications, office programs, a web browser, etc.) An interface 232 generates screen displays and receives user input via the input devices, e.g., by the user's typing on the keyboard, moving the mouse, or clicking with the mouse on a displayed control element. In some implementations, node 110 includes an authentication agent 235 that allows a user to obtain access to restricted data consistent with his privilege level and the security policies of the institution. Authentication agents are known in the art and described, for example, in U.S. Ser. No. 11/294,354, filed Dec. 5, 2005, the entire disclosure of which is hereby incorporated by reference, and may communicate with a remote authentication server that securely stores user credentials.

A desktop agent module 240 facilitates use of and interaction with remotely hosted applications via screen display 212, and also allows the user to modify settings on the application host server. For example, the user may specify or modify preferences, such as a set of default applications to be launched when a virtual desktop for the user is created.

Node 110 may also include, in system memory 204, an event-monitoring module 240, which monitors the RSSI of detected user devices 140. For example, wireless interface 217 may be configured for BLE communication, and may pair with a device 140 also capable of BLE communication. Pairing may be secured (i.e., prevented for devices not associated with authorized personnel) using one-time passwords, a device-specific shared secret, public/private key pair, etc., and/or by association of authorized users and their devices in a user database as detailed below.

After the BLE link is established, RSSI levels are obtained by RSSI circuit 220 and periodically stored sequentially in a partition of system memory 204. Continuously or periodically (e.g., each time a new RSSI reading is recorded), event-monitoring module 240 analyzes stored RSSI readings for patterns indicative or suggestive of a walkaway event. As noted earlier, simply relying on reductions in the signal strength is inadequate; the user's movements and handling of the device 140, or the introduction of obstructions (such as another person), can reduce the RSSI strength without a walkaway event, and false positives that force the user to re-authenticate are particularly problematic in a busy healthcare environment.

In one embodiment, event-monitoring module 240 is configured to ignore sudden changes in RSSI level that suggest device movement or the intrusion of another person between the device 140 and wireless interface 217, but to register more gradual changes associated with walkaway events. For example, if linearization of the previous n RSSI readings—with n dependent on the frequency with which RSSI readings are stored—produces a line whose negative slope exceeds a predetermined threshold indicative of a walkaway event, event-monitoring module 240 may register the event or, if the prediction accuracy of this mode of analysis is insufficient, may seek corroborating data. For example, when a conventional BLE application 245—which is responsive to BLE signals received via wireless interface 217—detects and pairs with a BLE-equipped device 140, BLE application 245 may send to location server 130 (see FIG. 1) the identifier of the device 110 obtained during pairing. Location server 130 interprets this as a request to subscribe to location events associated with the device 110 or its user, which location server 130 obtains from a user database as described below. If location server 130 has not detected any new location events associated with the user, then event-monitoring module 240 may determine that no walkaway event has occurred. Other modes of corroboration are possible alternatively or in addition. For example, event-monitoring module 240 may, upon detection of a suggestive RSSI pattern, interrogate the device 140 via wireless interface 217 for data indicative of device motion (e.g., an accelerometer and magnetometer used to provide pedestrian dead reckoning indicating whether the device is moving away from the node 110) and/or GPS coordinates as further described below. Traditional indicators of continued user activity, such as keyboard and mouse events, can also be considered; once again, this information may not be sufficient on its own, since someone else may be operating the node 110—precisely what the present approach is employed to avoid. These alternative sources of corroborating information may be combined with the RSSI pattern to infer the existence or absence of a walkaway event when neither the RSSI pattern nor the device motion information alone would provide sufficient predictive accuracy.

The level of certainty required for a walkaway event to be registered by event-monitoring module 240 may depend on the security policy, and that policy may be different for different users (based, e.g., on privilege level). When event-monitoring module 240 does register a walkaway event, the user's access to secure applications running on node 110, or to the entire session, is terminated pending the user's re-authentication. For example, event-monitoring module 240 may launch a privacy screen that the user can remove only by re-authenticating the authentication server 125 in the manner prescribed by the security policy. Alternatively, event-monitoring module 240 may terminate the session, e.g., saving it for re-launch at a new location as described below.

In some embodiments, two probability thresholds are employed: a lower threshold suggestive of a possible walk-away event (e.g., a probability of 50%) and a higher threshold more strongly suggestive of a walkaway event (e.g., a probability in excess of 70%). If the probability associated with an observed RSSI pattern exceeds the first threshold but not the second, event-monitoring module 240 may seek corroborating data, and refrain from registering a walkaway event absent corroborating data sufficient to increase the probability above 70%. If the probability associated with an observed RSSI pattern exceeds the second threshold on its own, a walkaway event is registered.

Pattern recognition can also be employed to detect the need for recalibration, due to, for example, RSSI threshold changes due to multiple streams of data from proximate BLE-enabled devices or other environmental change.

In another approach, event-monitoring module 240 implements a recurrent neural network (RNN). As is well known, an RNN performs the same task for every element of a sequence, with the output depending on the previous computations. An RNN implemented by event-monitoring module 240 operates on the temporal sequence of RSSI values and detects patterns indicative of a walk-away event. The RNN is trained on numerous interactions between users (with devices 140) and nodes 110, with walkaway events detected by other means (e.g., as described above) serving as labels. Following training, the RNN can monitor the probability of walkaway events based on the current and preceding RSSI readings; once again, if the probability is high enough, a walkaway event is registered, and if the probability is lower but greater than 50%, other data can be considered before a walkaway event is registered. Sufficient training will also allow the RNN to learn when recalibration is necessary.

It should be noted that although the above discussions focused on BLE, any form of wireless communication from which a range can be inferred between paired or communicating devices (e.g., various IEEE 802.11 protocols and other radio communication modalities) may be employed.

Figure 3:
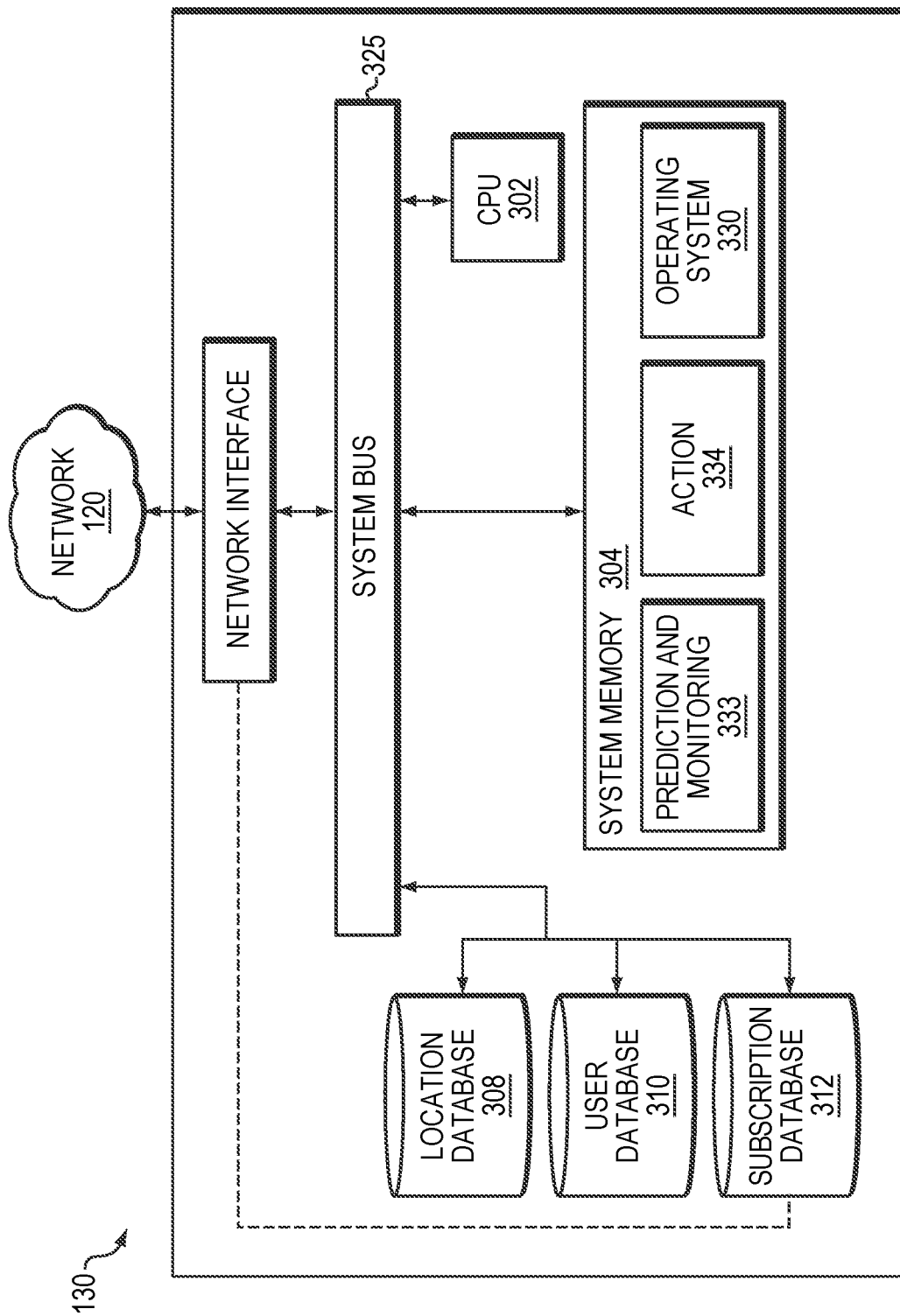
FIG. 3 schematically illustrates a location server in accordance with embodiments of the invention.

FIG. 3 illustrates a location server 130 that also typically includes a processor 302 (e.g., a CPU) and associated system memory 304, a network interface 306, a system bus 325, and one or more non-volatile digital storage elements including a location database 308, a user database 310, and a subscription database 312. The databases 308, 310, 312 may be stored locally as separate files or disk partitions, or may be stored remotely and accessed via network interface 306. Location database 308 stores records each specifying a node and its most recently determined physical location, and may also indicate its distance from other nodes. User database 310 stores records each specifying a user, location information for the user as described in greater detail below, a provisioning policy for the user, and, in some cases, a user privilege level. User database 310 may also associate one or more mobile devices 140 with each user based on a secure registration procedure. Subscription database 312 stores records each specifying an application and events or event categories to which the application has subscribed. Applications may subscribe and unsubscribe dynamically to different events depending on context; for example, as described earlier, when a secure application is launched (or when a general-purpose application requests access to secure data), it may either autonomously subscribe to security-related events or, instead, may be automatically subscribed by authentication server 125 upon initial user authentication. These subscriptions may be removed once the user exits the application or logs off. Authentication server 125 may also subscribe in the manner of an application each time an authentication event occurs and the applicable security policy has a locational component.

This multi-database arrangement provides flexibility in separating the task of keeping track of nodes and the task of keeping track of user activity and preferences the former involving ongoing location awareness of nodes that may move and the latter involving ongoing awareness of current user activity and location. It also separates detection and logging of events from their application-level consequences. It should be stressed, however, that any number of databases, including a single database, may be used. Physical device locations may be obtained in any suitable fashion, e.g., entered once for fixed devices or reported by the devices or by others as devices are moved.

System memory 304 includes stored instructions defining an operating system 330. In addition, memory 304 stores a prediction and monitoring application 333 that, in various embodiments, predicts the next location of a user in response to a location-based triggering event (e.g., the detected departure of the user from a node), and an action module 334 that causes an action to be taken based on the triggering event. More generally, server 130 (as well as servers 125 and 115, which are conventional) may be implemented on any suitable computing platform including a processing unit, a system memory, and a system bus that couples various system components including the system memory to the processing unit. During operation, the system memory contains the instructions implementing the functionality described herein. Computers typically include a variety of computer-readable media that can form part of the system memory and be read by the processing unit. By way of example, and not limitation, the system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the Unix operating system, the LINUX operating system, the Xenix operating system, the IBM AIX operating system, the Hewlett Packard UX operating system, the MACINTOSH operating system, the APACHE operating system, an OPENSTEP operating system or another operating system of platform.

Anticipatory provisioning may involve maintaining a consistent desktop session from device to device or optimistic pre-caching of data at predicted locations. Desktop sessions are maintained by desktop server 115 (see FIG. 1), which may run one or more thin-client computing or remote display presentation applications. In one embodiment, server 115 executes as an application any portion of the CITRIX ACCESS SUITE by Citrix Systems, Inc., such as the METAFRAME or CITRIX PRESENTATION SERVER products, or applications such as CITRIX XENAPP, CITRIX XENDESKTOP, CITRIX ACCESS GATEWAY, and/or any of the MICROSOFT WINDOWS Terminal Services from Microsoft Corporation. As is conventional, desktop server 115 may maintain a default list of applications for each user (which list may be modified, either directly by the user or based on user activity) and session data. The session data enables a current session state to be fully replicated—i.e., each application as well as retrieved data are stored, either directly or (more commonly) as pointers, so that the user may continue a current session on a new virtual desktop launched, using the session data, on a different node. When the virtual desktop is created from the "golden image" (i.e., a master template), the current or default record data is used to deliver applications and retrieve data in accordance with the user's record in database 310.

Thus, a "virtual desktop," as that term is used herein, broadly refers to a particular suite of applications launched by or otherwise delivered to a user, and data either typically or currently accessed by the user. In some circumstances, the virtual desktop represents the state of the user's current or most recent session on a node, including applications launched and user-requested data. In other circumstances, the virtual desktop is a representative session tailored to the particular user, either based on a registration sequence in which the user specifies applications to be launched at startup, or based on monitoring of user activity. It should also be stressed that a virtual desktop can be a browser-based session connected to a hosted webserver, which may deliver either applications or a web session via the browser. The web session may be a portal for other applications or even a web-delivered desktop. Accordingly, virtual desktops as understood herein do not require specialized infrastructure for delivery and use.

The current state of a user's hosted session is maintained in user database 310 and is easily updated, for example, by the desktop agent 240 resident on the user's current node 110 in response to a location-based triggering event. Desktop agent 240 monitors applications launched locally and remotely via the node 110, and adds identifiers for these applications to the user's record in user database 310. In addition, desktop agent 240 agent monitors data retrieved by the user (typically, though not necessarily, via one of the applications) and adds identifiers for these as well. For example, retrieved data may include documents opened in a word processor, patient records accessed via an EMR system, lab reports, real-time patient data obtained remotely from a medical device, etc. In some circumstances, the current data may be deleted and the default options reinstated—e.g., after a sufficiently long period has elapsed since session log-off that the prior session is unlikely to be relevant, or if the user has entered a different institutional facility. If the user has logged off from a session, or the session has timed out (i.e., has been deleted due to persistent inactivity), desktop server 115 will provision the user's default applications. If the user has not logged off, or has instructed desktop server 115 to save the current session, that session will be recreated for the user at the appropriate time—and just what time is appropriate may depend on various factors.

Alternatively, anticipatory provisioning may take place outside the scope of existing user sessions, e.g., by optimistic launching of applications with which the user has not yet interacted or, if the application is already running, optimistic data caching. Thus, desktop server 115 (or a separate application server) may be configured to host applications remotely and make them available on target devices and/or cause applications to be launched locally on a target device. Desktop server 115 may, for example, be programmed to subscribe to predicted location events involving particular individuals (whose routines make them good candidates for optimistic launching, for example). With reference to FIGS. 1 and 3, if prediction and monitoring application 333 predicts that a clinician is headed for particular location and is likely to require a certain application when he gets there, location server 130 may signal desktop server 115 to launch the application on a device at the predicted location but with disabled visibility; the application becomes visible when the user's presence is detected. For example, suppose a surgeon has patients in a hospital's intensive-care unit. When the surgeon reaches her first patient, her location is registered by location server 130. Prediction and monitoring module 333, after consulting databases 308, 310, determines that two other patients of the surgeon are located in the same intensive-care unit, and as a result, the surgeon is likely to soon visit both. Location server 130 signals desktop server 115 to bring up the EMR of the closest of the two other patients on a device in the patient's room, but disabling user input and visibility so that the data is ready but not active. When the surgeon actually enters the second patient's room, approaches the device, and gestures (e.g., waving a registered mobile device) or touches a proximity reader, she is recognized by the local hosting device, which—either autonomously or following communication with authentication server 125 so as to satisfy security policy 140 unlocks the input capability and removes the privacy screen, making the data visible and input-capable. The surgeon having departed from the previous patient's room, desktop server 115 may tear down the EMR application in that patient's room immediately or keep it alive, with the privacy screen restored, for a short time in case the surgeon returns. The foregoing prediction and opportunistic caching steps are further repeated and data is cached at a device co-located with the third of the surgeon's patients in the intensive-care unit. If, on the other hand, the surgeon does not arrive at the second patient's room after a predetermined period of time (e.g., a multiple of the estimated time it should take the surgeon to walk there) elapses following her detected departure from the first patient's room, the EMR application may be torn down.

The timing and mode of provisioning reflect a trade-off between use of system resources and the immediacy and scope of a user's need. A virtual desktop presumes an existing user desktop session and the need for access to all applications active in the session; the virtual session may be delivered on a node as soon as the user has logged on and authenticated himself at the node, or may not even be assembled until the user logs on. To reduce resource utilization, a user's default applications are not launched, or a current session is not regenerated at desktop server 115, until the user actually logs in. This minimal approach reflects common conventional practice. The latency experienced by a user may be reduced by instantiating a new (default) session or maintaining a current session on desktop server 115, so that when the user logs in at a new node, the virtual desktop has already been created and can be delivered there. For example, a default virtual desktop may be created at desktop server 115 when a user's presence is initially detected at the facility or, in some implementations, in a particular location (e.g., department). The latency experienced by the user is minimized when the virtual desktop is delivered to a predicted location and, when it becomes active, is hidden from view until the user logs in.

The ability to avoid virtualizing and regenerating a desktop session obviously reduces resource utilization, so anticipatory caching of application data—particularly if an instance of the relevant application is already running on the target device—is a far more lightweight option than desktop provisioning. In some instances, applications may be configured to give the user the option to quit or suspend the desktop session and specify a destination device or location, and also to select whether to provision the entire desktop or just a current application. If the destination device is associated with a particular individual in database 310—e.g., with a patient because the device is located in the patient's room—desktop server 115 may cause the launched instance of the application to retrieve information associated with that patient.

Following a location-based triggering event, the user's record in user database 310 is updated, and is updated again the next time the user is detected at a monitored location. As noted above, the user's current location may be based on indicators such as the device on which the user's current session is active or, if the device location is unknown or no session is active, based on perimeter accesses and RTLS. To support the operation of prediction and monitoring module 333, user database 310 may maintain a history of sequentially detected user locations, e.g., over the course of a day or longer period.

A location-based triggering event can be any detectable event suggesting a user change of location. For example, when a user logs off a current session, or if a walk-away event is detected at the user's current node, a triggering event may be recorded by module 333; more specifically, in the illustrated embodiment, the current node reports the log-off or walk-away event to location server 300, and module 333 both updates the user record in database 310 to reflect an unknown current user location and takes action based on the provisioning policy in the user record. Other location-based detection events can include log-in at a device other than that listed as the user's current device in user database 310 (indicating that the user has departed from the listed device without logging off or having the departure detected), or presence detection at a location different from the location of the device listed as the user's current device in user database 310. More generally, any event associating the user with a current location e.g., passing through perimeter security, having an access card or user-associated mobile device detected by a reader, etc.—can be detected and reported to module 333. Depending on the provisioning policy associated with the user, such events may only have significance (i.e., cause an action to take place) if a current user device and/or desktop server 115 reports the user as having logged on via authentication server 125. In this way, resources are not committed for users who have not yet begun sessions and/or authenticated themselves. For some users, however, mere detection may cause a virtual desktop to be created. For example, for some personnel (e.g., surgeons and supervisory personnel), the virtual desktop may be created as soon as the individual's presence within a facility is detected, e.g., by perimeter entry system 105, or when s/he is detected (e.g., by a beacon or RTLS 107) near a particular location within the facility. These location criteria and associated actions are stored in the provisioning policy field of the user's record in database 310, e.g., as a privilege level.

With reference to FIGS. 1-3, in a representative operational sequence, location server 300 registers a location-based triggering event involving a user. In response, module 333 retrieves from user database 310 the provisioning policy associated with the user. Module 333 may signal desktop server 115 to save the current session state of the user; for example, module 333 may retrieve from database 310 the identifier of the device at which the triggering event was detected and instruct desktop server 115 to save the current session state at this device (and, in some cases, also to terminate the session to avoid unwanted visibility of sensitive data on the device display) and/or to maintain the user's virtual desktop so that it may be accessed directly from a different device (following user authentication thereon).

Module 333 may predict the next location or device where the user is expected to appear. In some embodiments, module 333 uses a simple rule base to predict the node that a user is most likely to use next. Such an approach is feasible where user activity tends to follow established patterns. For example, if module 333 detects that a surgeon has just departed a hospital's imaging department after viewing a patient's CAT scan, it may query a hospital information server for the current location and status of the patient whose scan was being viewed. If the patient is scheduled for surgery, module 333 may query location database 308 to determine the device closest to the surgical suite where the patient is expected to soon arrive, and instruct desktop server 115 to deliver a virtual desktop to this device and recreate thereon the saved user session.

If actions beyond instructing the desktop server 115 to deliver a virtual desktop are contemplated, they may be executed by the dedicated action module 334. For example, in response to a triggering event, action module 334 may cause commands to be sent via network interface 206 to set the closest printer associated with the target device where the virtual desktop will be delivered; bridge USB devices associated with the target device so they can be accessible by the hosted session when the user arrives at the target device; retrieve and display a census of the patients on the floor that the provider needs to see; cause additional applications outside the virtual desktop to be launched at the target device or at a neighboring or connected device; and connecting and enabling dictation at the target location.

Module 333 may also base a location prediction on past activity and/or correlations between application use and subsequent activities, using, for example, conventional unsupervised learning or neural-net techniques. In these embodiments, a location history maintained for each user in database 310 is used to update the predictive model. For example, the user's daily monitored movements may be used to update the model at the end of a day.

The timing of creation and delivery may depend on the identity of the user and the degree of confidence in a prediction. In some embodiments, virtual desktops are assembled and, in some cases, delivered to a node in advance for users who, for example, frequently move among nodes; such users would otherwise repeatedly suffer start-up delays as virtual desktops are prepared, and the commitment of additional computational resources to prepare the desktop in advance is merited for such users. A user's priority determining whether a virtual desktop is prepared in advance may depend on a privilege level associated with the user in database 310. For high-priority users, the virtual desktop may be prepared as soon as the user's entry into the facility has been registered, and it may be delivered to the node that the user is likely to access first (e.g., based on past history). After these high-priority users have logged in, a location-based triggering event indicative of departure from a node may be sufficient to cause delivery of a virtual desktop to a predicted next node; while for lower-priority users, a second location-based triggering event indicative of arrival at a node is necessary to cause delivery of the virtual desktop to that node.

In some embodiments, the virtual desktop is not created (or delivered to the predicted next node) unless a sufficiently high confidence level is registered (or unless the user's privilege level is sufficiently high). The confidence level may be based on various factors—most simply, the user's history of movement patterns among nodes. However, the desktop server may consider corroborating factors tending to reinforce the prediction (in a manner analogous to optimistic caching). For example, if, having walked away from node A, past activity patterns (of the particular user or generally among users) suggest the user will next log on at node B, the confidence level is increased if RTLS detects the user in proximity to node B or predicts a trajectory encompassing node B. Setting up the virtual desktop at this point of prediction rests on a relatively high confidence level that the operations will not be wasted, and occurs sufficiently in advance of the user's actual arrival at node B to avoid set-up delay when the user logs on. Conversely, delivery may be suspended if the predicted node is currently in use by someone else, or delivery may be shifted to a nearby node (particularly if there are no other nodes in the vicinity). If the user passes the predicted node without stopping, the virtual desktop may be revoked from the predicted node, at which point the desktop server may predict a new destination for the user. In this context, revocation generally means that the provisionally established connection between the virtual desktop and the predicted device is broken.

Preferably, it is the user's physical destination, rather than the identifier of a particular device that can be moved, which is predicted. Records in location database 308 associate a predicted destination with the device currently at that location.

Any suitable programming language may be used to implement without undue experimentation the functions described above, including those of desktop agent 240 and prediction and monitoring module 333, with processing responsibility allocated between node 110 and servers 115, 130 as desired by the system designer. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript, for example. Further, it is not necessary that a single type of instruction or programming language be utilized in conjunction with the operation of the system and method of the invention. Rather, any number of different programming languages may be utilized as is necessary or desirable.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method of detecting departure, from proximity to a node, of a previously authenticated user accessing a secure resource via the node, the method comprising:
after the user has been authenticated and has accessed the secure resource, establishing a wireless communication link between the node and a device proximate thereto, wherein the device is not utilized to access the secure resource or to enable access to the secure resource;
verifying an association between the authenticated user and the device;
monitoring over time, by the secure resource, a signal strength of the wireless communication link and periodically storing, in a computer memory, values indicative of the monitored signal strength;
periodically analyzing the stored values for patterns indicative of a walkaway event from the node and, when a pattern indicative of a walkaway event is detected, assigning a probability thereto; and
when the probability exceeds a threshold specified by a security policy, registering a walkaway event and terminating the authenticated user's access to the secure resource via the node.

2. The method of claim 1, wherein the association between the authenticated user and the device is verified by communication with a location server having access to a user database.

3. The method of claim 1, wherein the authenticated user's access to the secure resource via the node is terminated by ending a session hosted by the node.

4. The method of claim 1, wherein the authenticated user's access to the secure resource via the node is terminated by launching, on the node, a privacy screen removable only by a new authentication.

5. The method of claim 1, wherein the wireless communication link is a short-range wireless protocol.

6. The method of claim 5, wherein the short-range wireless protocol is Bluetooth Low Energy.

7. The method of claim 1, wherein the stored values are periodically analyzed for patterns indicative of a walkaway event from the node using a recurrent neural network.

8. The method of claim 1, further comprising, by the node following the user's authentication, subscribing to location events of the user with a location server configured to broadcast location events to subscribers thereto.

9. The method of claim 1, further comprising, by the node following the user's authentication and verification of the association between the user and the device, subscribing to location events of the device with a location server configured to broadcast location events to subscribers thereto.

10. The method of claim 1, wherein the node is a workstation.

11. The method of claim 1, wherein the node is a network-connected medical device.

12. The method of claim 1, wherein the secure resource comprises one or more electronic medical records.

13. The method of claim 1, wherein the node is disposed within an institutional space, and further comprising monitoring a location of the user within the institutional space.

14. The method of claim 13, wherein the location of the user is monitored using a real-time location services (RTLS) system.

15. The method of claim 13, wherein the node is movable within the institutional space, and/or a location of the node is unknown.

16. The method of claim 1, further comprising, prior to establishing the wireless communication link between the node and the device, and prior to the user accessing the secure resource:
authenticating the user at the node, without using the device, in accordance with a security policy applicable both to the user and the secure resource.

17. The method of claim 16, wherein authenticating the user comprises receiving a credential from the user.

18. The method of claim 17, wherein the credential comprises a password.

19. The method of claim 17, wherein the credential comprises an access card different from the device.

20. The method of claim 17, wherein the credential comprises one or more biometric indicia.

21. The method of claim 16, wherein authenticating the user comprises detecting a real-time location services (RTLS) tag, different from the device, associated with and co-located with the user.

22. A method of detecting departure, from proximity to a node, of a previously authenticated user accessing a secure resource via the node, the method comprising:
establishing a wireless communication link between the node and a device proximate thereto, wherein the device is not utilized to access the secure resource;
verifying an association between the authenticated user and the device;
monitoring over time, by the secure resource, a signal strength of the wireless communication link and periodically storing, in a computer memory, values indicative of the monitored signal strength;
periodically analyzing the stored values for patterns indicative of a walkaway event from the node and, when a pattern indicative of a walkaway event is detected, assigning a probability thereto; and
when the probability exceeds a threshold specified by a security policy, registering a walkaway event and terminating the authenticated user's access to the secure resource via the node,
wherein the threshold is a first threshold and, when the probability does not exceed the first threshold but does exceed a second threshold lower than the first threshold, further comprising obtaining corroborating data indicative of the probability of a walkaway event.

23. The method of claim 22, wherein the corroborating data comprises a GPS location obtained from the device.

24. The method of claim 22, wherein the corroborating data comprises pedestrian dead reckoning.

25. The method of claim 22, wherein the corroborating data comprises input device events associated with the node.

26. The method of claim 25, wherein the input device events comprise keyboard and/or mouse events.

27. The method of claim 22, further comprising:
when the corroborating data increases the probability such that the probability exceeds the first threshold, registering a walkaway event from the node and terminating the authenticated user's access to the secure resource via the node; and
when the corroborating data does not increase the probability such that the probability exceeds the first threshold, refraining from registering a walkaway event from the node.

* * * * *